United States Patent [19]

Beck

[11] Patent Number: 4,537,382

[45] Date of Patent: Aug. 27, 1985

[54] SWAY ROD SUSPENSION SYSTEM

[75] Inventor: Franklin L. Beck, Guilford, Conn.

[73] Assignee: Sperry Corporation, New York, N.Y.

[21] Appl. No.: 345,868

[22] Filed: Feb. 4, 1982

[51] Int. Cl.³ ............................................. F16M 13/00
[52] U.S. Cl. ..................................... 248/568; 68/23.3;
210/380.2; 248/636; 494/82
[58] Field of Search .............. 248/568, 569, 573, 574,
248/583, 610, 613, 608, 609, 636, 638; 68/23.3,
23.1; 210/144, 380.2; 494/82

[56] References Cited

U.S. PATENT DOCUMENTS

| | | | |
|---|---|---|---|
| 2,678,796 | 5/1954 | Roy | 248/613 |
| 2,678,797 | 5/1954 | Roy | 248/613 |
| 2,711,297 | 6/1955 | Thiele | 248/568 |
| 2,941,390 | 6/1960 | Frey | 210/144 |
| 2,976,998 | 3/1961 | Smith | 68/23.3 |
| 3,373,961 | 3/1968 | Long | 248/568 |

Primary Examiner—J. Franklin Foss
Assistant Examiner—David L. Talbott
Attorney, Agent, or Firm—Howard P. Terry

[57] ABSTRACT

In a suspension system for a gyrocompass or similar device, a plurality of sway rods, springs and shock snubbers are combined to isolate the gyrocompass or similar device from vibrations having low frequencies in all directions.

19 Claims, 5 Drawing Figures

SWAY ROD SUSPENSION SYSTEM

BACKGROUND OF THE INVENTION

1. Field of the Invention

The present invention relates to suspension systems for gyrocompasses and similar devices which require isolation from their mounting surfaces, and more specifically to a suspension system for isolating such devices from vibrations having low resonant frequencies on the order of 5 Hz or less.

2. Description of the Prior Art

Suspension systems used heretofore to isolate gyrocompasses and similar devices typically can not provide isolation from vibrations having low natural frequencies in all directions along a set of principal orthogonal axes. Consequently, existing suspension systems do not have correlation between the vertical (z axis) and the horizontal (x and Y) axes. Typically, coil springs have been used without success to isolate gyrocompasses and similar devices from vibrations having a natural frequency of less than 5 Hz along all axes. In such suspension systems coil springs are mounted vertically to provide isolation from vibrations having low natural frequencies in the vertical direction, but spring stiffness rates and damping coefficients of the coil springs do not provide sufficient isolation from vibrations having low natural frequencies along the horizontal x and y axes. Those skilled in the art, therefore, have attempted to solve this problem of horizontal isolation with various methods, but they have met with little or no success. Typically, the methods used have included leaf springs disposed against the sides of the device to be isolated; rubber "wobble" plates having a post embedded therein or vulcanized thereto; compression or extension springs either horizontally or diagonally mounted to the device; or using the vertically mounted coil spring to provide horizontal spring stiffness. Accordingly, there is a need for a suspension system which correlates springs, dampers, and shock snubbers into a suspension system which provides isolation from vibrations having low frequencies in all directions.

SUMMARY OF THE INVENTION

The apparatus of the present invention provides a suspension system for a gyrocompass or similar device which is mounted on a platform and disposed within a frame or enclosure and which is subject to low frequency vibrations. At least three vertically disposed sway rods which are preferably fabricated from spring steel are rigidly fixed to the frame. The sway rods are pivotally coupled to the mounting platform by slidable ball joints. In the preferred embodiment of the invention a plurality of shock snubbers limits the horizontal translation of the free ends of the sway rods and also limits the vertical translation of the mounting platform. The preferred embodiment of the present invention further includes means for damping both the horizontal translations of the sway rods and the vertical translations of the platform. The suspension system of the present invention isolates the gyrocompass or similar device from low frequency vibrations in all directions.

DESCRIPTION OF THE PREFERRED EMBODIMENT

Figure 1:
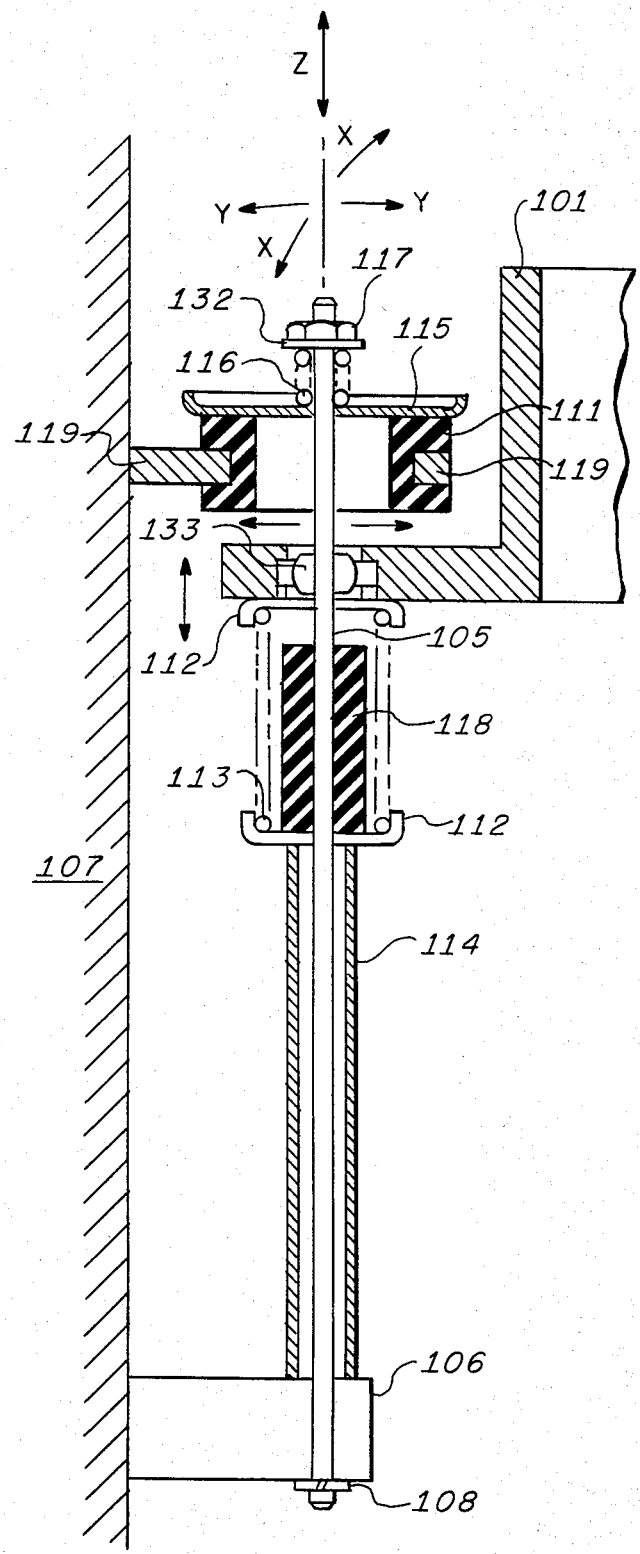
FIG. 1 illustrates in cross section one of the sway rods and its associated components included in the suspension system of the present invention.

Referring now to FIG. 1, a cross sectional view illustrates a portion of a preferred embodiment of the novel sway rod suspension system. It should be noted that the sway rod suspension system must include at least three sway rods 105 useful in isolating a gyrocompass (not shown) or similar device disposed on a mounting ring 101 or platform from low frequency vibrations. It has been discovered, however, to be preferable to use four sway rods 105 disposed at each corner of a square enclosure 107. Since all the sway rods 105 in any particular suspension system are identical, for purposes of simplicity, only one sway rod 105 is illustrated in FIG. 1 and will be described hereinafter.

In the preferred embodiment, the sway rod suspension system isolates the gyrocompass or similar device from the frame or enclosure 107 which is subject to vibrations having low natural frequencies on the order of 5 Hz or less. The sway rod 105 which is preferably fabricated of spring steel or similar spring material is rigidly fixed in support block 106 which in turn is fixed to the frame or enclosure 107. Preferably, sway rod 105 is locked in support block 106 by means of a retaining ring 108 or, as described in alternate embodiments, by means of a set screw or a press fitting. It should be noted that a set of orthogonal axes are illustrated directly above the free end of the sway rod 105 to designate a horizontal plane and a vertical axis. The z axis is the vertical axis, and the x and y axes define the horizontal plane. The free end of the sway rod 105 is free to translate in the horizontal plane defined by the x and y axes, and the horizontal travel of the sway rod 105 is limited by a snubber 111 which is preferably fabricated from an annular piece of rubber and which is fastened to the frame 107 by a support arm 119. A ball joint 133 which includes an aperture to permit ring 101 along with ball joint 133 to slide along rod 105, pivotally couples the mounting ring 101 to the sway rod 105 and allows the mounting ring 101 to move in the horizontal plane defined by the x and y axes. The mounting ring 101 along with the gyrocompass or other similar device is vertically supported by a pair of cup washers 112 separated by a spring 113. The cup washers 112 and the spring 113 are in turn supported by a spacer tube 114 disposed upon support block 106. It should be noted that resistance to rotation about the vertical (z axis) is provided by the spring rate of the sway rods 105.

Damping in the horizontal plane defined by the x and Y axes for the sway rod suspension system of FIG. 1 is provided by a steel disk 115 which presses against the snubber 111. The steek disk 115 is placed under pressure by the compression of a spring 116 which is restrained by a nut 117 and a washer 132 coupled to the free end of the sway rod 105. Damping in the vertical direction along the z axis for the sway rod suspension system is provided by the snubber 118 which is disposed on the sway rod 105 within the spring 113. Preferably the snubber 118 is sized to press against the coils of the spring 113.

Figure 2:
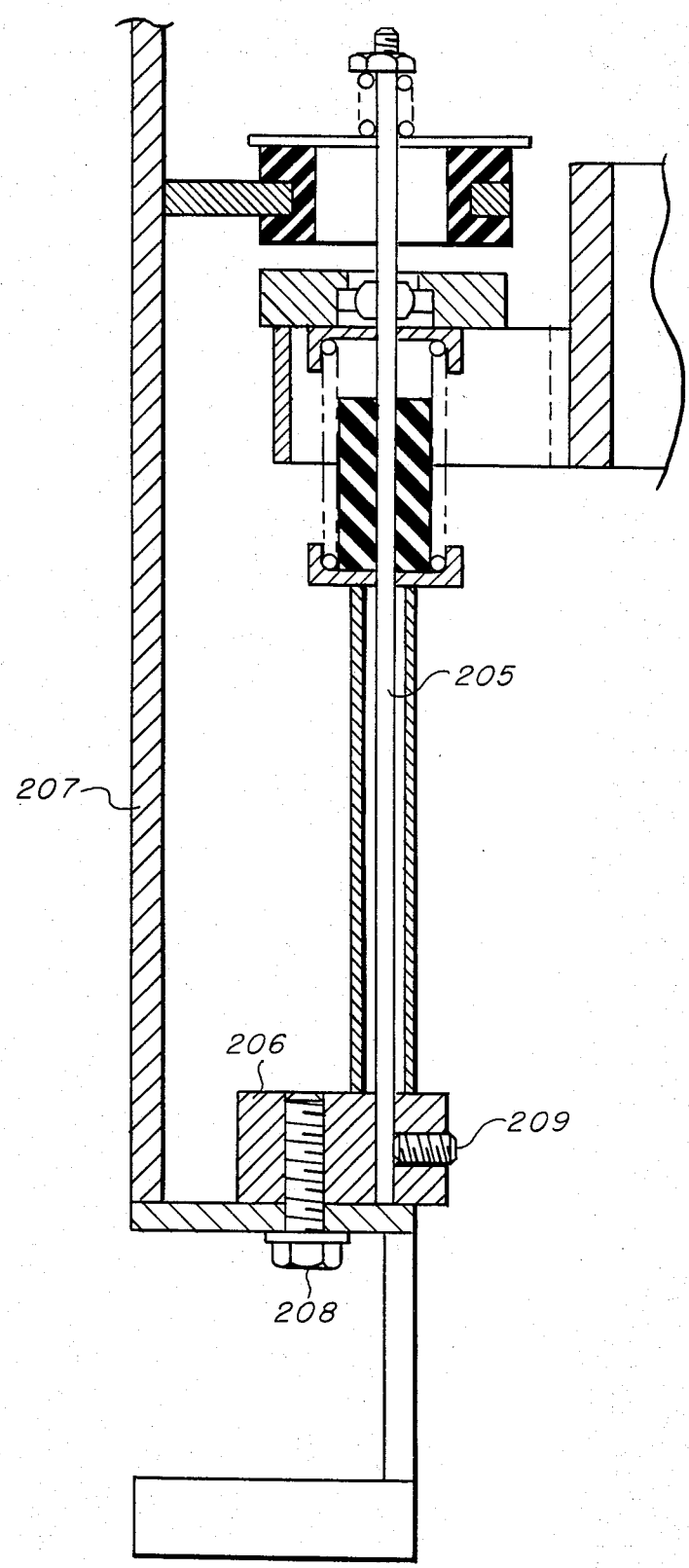
FIGS. 2, 3 and 4 illustrate in cross section one of the sway rods and its associated components included in alternate embodiments of the present invention.

Referring now to FIG. 2, an alternate embodiment of the present invention is illustrated. The apparatus of FIG. 2 is substantially similar to the apparatus of FIG. 1 except for the mounting of the sway rod 205 to the frame or enclosure 207. The support block 206 is coupled to the support frame 207 by a bolt 208 which is threaded into the support block. The sway rod 205 is fixedly coupled to the support block 206 by a set screw 209 also threaded into the support block 206.

Figure 3:
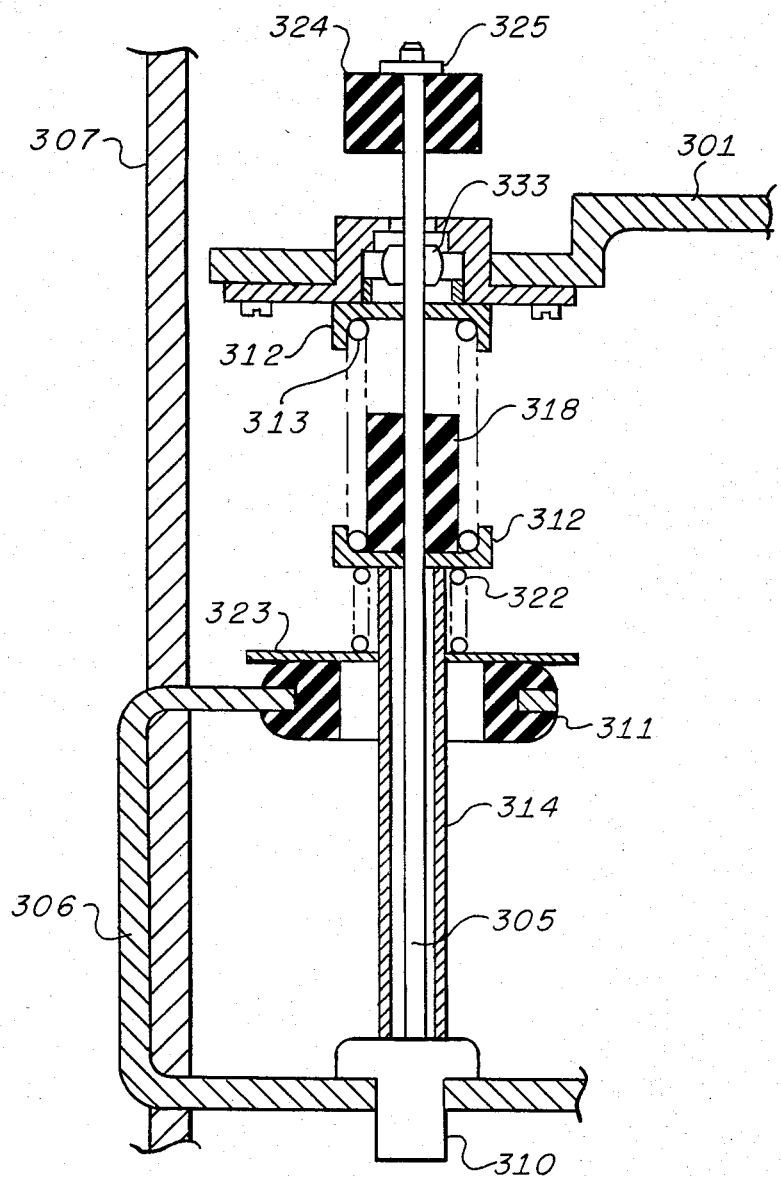

Referring now to FIG. 3, a further alternate embodiment of the present invention is illustrated. In FIG. 3 a support bracket 306 is attached to the frame 307, and preferably the sway rod 305 is secured to the support bracket 306 by a press fitting 310. The upper portion of the support bracket 306 supports the snubber 311 which limits the travel of the sway rod 305 in the horizontal plane defined by the x and y axes. A damping spring 322 is disposed between a disk 323 and the lower cup washer 312. As in FIG. 1, the mounting platform 301 is pivotally coupled to the sway rod 305 by a slidable ball joint 333. The spacer tube 314, the cup washers 312, and the spring 313 support the mounting platform 301. It should be noted that the upward vertical translation of the mounting platform 301 is limited by a snubber 324 which is coupled to the sway rod 305 by a grip ring or clamp 325, and the downward vertical translation of the mounting platform is damped by the snubber 318 disposed within the coils of spring 313.

Figure 4:
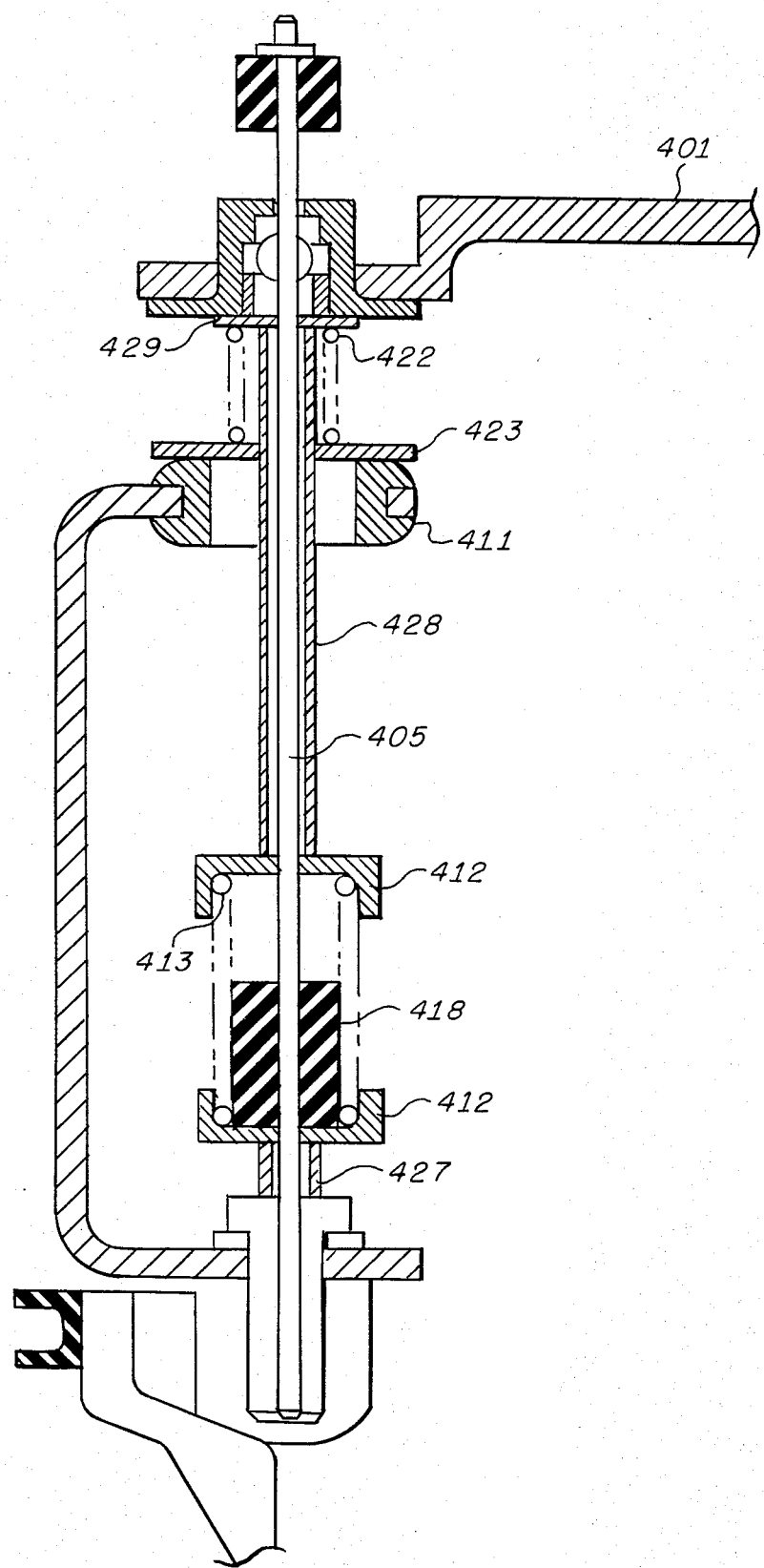

Referring now to FIG. 4, a still further alternate embodiment of the present invention is illustrated. The apparatus of FIG. 4 is somewhat similar to the apparatus of FIG. 3 except that the cup washers 412, the spring 413 and the snubber 418 are disposed beneath the snubber 411 and supported by the spacer tube 427. Disc 429 which supports platform 401, is supported by upper washer 412 and tube 428. Damping washer 423 presses against snubber 411 due to pressure of spring 422 and thereby damps the horizontal translations of the suspended device. Damping washer 423 is permitted to slide axially along tube 428.

The operation of the present invention will now be described for the preferred embodiment illustrated in FIG. 1, but it should be noted that the principles of operation are substantially the same for the alternate embodiments illustrated in FIGS, 2, 3, and 4.

Referring now to FIG. 1, when a dynamic input, i.e., a forcing frequency, is applied to the frame or enclosure 107 along the vertical axis (z axis) the gyrocompass or similar device is isolated from low frequency vibrations in the vertical direction. The dynamic input to the frame 107 causes the support 106, the spacer tube 114 and the cup washer 112 to vibrate at the forcing frequency and its associated amplitude. The spring 113, however, is sized to isolate the mounting ring 101 and the mass, the gyrocompass, which is disposed thereon from the forcing frequency, i.e., ball joint 133, cooperates with the sway rod 105 and slides along the sway rod 105 in a substantially vertical direction in response to the dynamic input. The snubber 118 rubs against the coils of the spring 113 and provides for vertical damping of the spring 113. It should be noted that the sway rod 105 does not support any of the vertical load.

Vertical shock snubbing is provided in the downward direction when the mounting ring 101 and the upper cup washer 112 are deflected downward causing the compression of spring 113 and the impaction of upper cup washer 112 with the snubber 118. When the mounting ring 101 is deflected upwards, the impaction of the mounting ring 101 with snubber 111 provides vertical snubbing in the upward direction.

Since all of the weight of the gyrocompass, as described above, is supported by the vertical spring 113, the spacer tube 114, cup washer 112 and the support 106, the function of the sway rod 105 is to isolate horizontal loads applied to the suspension system. When a horizontal forcing frequency, i.e., a dynamic input, is applied to the frame 107 and transferred to the support block 106, the lower portion of the sway rod 105 which is fixedly coupled to the support block 106 is caused to move at the forcing frequency. The upper portion of the sway rod 105 acts as a cantilever spring. The upper portion of the sway rod 105 has the mounting ring 101 and the mass disposed thereon pivotally coupled to it by the ball joint 133 and translates in the horizontal plane defined by the x, y axes. The length of the sway rod 105 from the ball joint 133 to support block 106, the diameter of the sway rod 105, and the material of the sway rod 105 may be selected to isolate the mounting ring 101 from vibrations having a low natural frequency (5 Hz or less) in the horizontal plane. It should be noted that the inside diameter of the spacer tube 114 provides a clearance for the sway rod 105 to bend within the tube.

Damping in the horizontal direction defined by the x, y axes is provided by coulomb damping, i.e., dry friction, of the disc 115 bearing against the snubber 111 by the action of the spring 116. It should be noted that the disc 115 is permitted to slide along rod 105 due to a clearance hole in disc 115. The coefficient of damping may easily be adjusted by either changing spring 116 or by adding or subtracting washers 132 which will either increase or decrease the compression of spring 116.

Shock snubbing in the horizontal direction defined by the x and y axes is provided by limiting the translation of the sway rod 105 within the inside diameter of the snubber 111 which is attached to the frame 107 by the support arm 119. This arrangement not only provides for snubbing in the horizontal plane defined by the x and y axes, but it permits the sway rod 105 to rest against the snubbers 111 when the frame 107 is tilted such that the translation permitted by the snubber 111 is exceeded.

Figure 5:
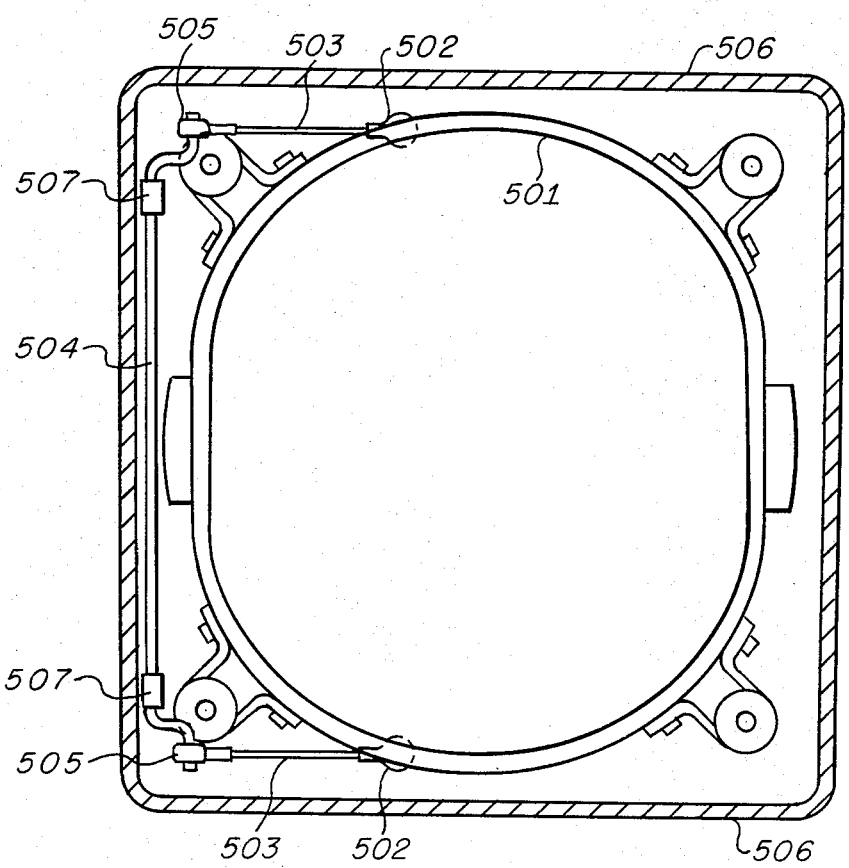
FIG. 5 illustrates an alternate embodiment which incorporates a stabilizer bar and associated linkages to prevent rotation of the platform supporting the device to be isolated.
Figure 5A:
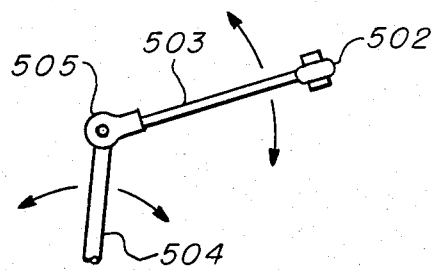
Figure 5B:
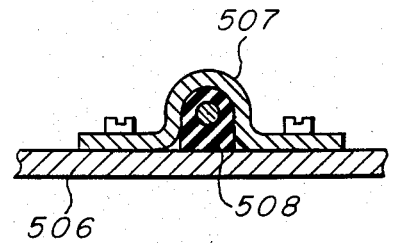

Referring to FIG. 5, a stabilizer bar 504 and associated linkage may be added to any of the above described sway rod suspension systems in order to prevent azimuthal rotation of the platform supporting the device to be isolated, to a much greater degree than the embodiments shown in FIG. 1, 2, 3 and 4. In these previous embodiments, for example as in FIG. 1, rotational inputs to the frame 107 are transmitted to the platform 101 due to the spring rate of the rods 105, and also centering in rotational location is due to the restoring spring rate of the rods. This arrangement is satisfactory for required centering under torsional vibration inputs in order to cause the platform 101 to maintain its rotational location with respect to the frame 107 within approximately 1°. Should a greater degree of accuracy be required for the suspended device in relation to its frame in rotational alignment, e.g., on the order of less than 0.25° (15 minutes of arc), the embodiment of FIG. 5 is preferred.

The platform 501 of FIG. 5 is supported as per any of the previous embodiments. Disposed approximately 180° apart on the platform 501 are ball joints 502 fixed to the platform 501 and rigid link rods 503. The link rods 503 are mounted to the stabilizer bar 504 with ball joints 505. The stabilizer bar 504 is mounted to frame 506 with clips 507. Bushing 508 permits stabilizer bar 504 to rotate within bushing 508. It should be emphasized that the stabilizing bar arrangement of FIG. 5 may be adapted for use with any of the embodiments shown in FIGS. 1, 2, 3 and 4.

In operation when frame 506 is vibrated, platform 501 moves in relation to the frame 506. The platform 501 is not restrained in movement in the plane defined by the x and y axes, and also in the upward and downward direction by the stabilizer bar due to the movement permitted by ball joints 502, 505, and rotation of bar 504 in bushings 508. However, should the platform 501 tend to rotate in azimuth in relation to frame 506, stabilizer bar 504 prevents this due to action of rigid link rods 503 which otherwise would have to twist bar 504. Stabilizer bar 504 may be rigid or be sized to permit torsional deflection.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A suspension system for an instrument having a frame and vertically supported mounting platform, comprising:
    at least three vertically disposed sway rods each fixedly attached at a first end to said frame and pivotally and slidably coupled to said vertically supported mounting platform such that a second end of said sway rods is substantially free to translate in a horizontal plane defined by a pair of orthogonal axes and said mounting platform is substantially free to translate along a vertical axis normal to the horizontal plane;
    first means coupled to said frame for limiting translation of said second ends of said sway rods in said horizontal plane;
    second means for limiting the translation of said mounting platform along said vertical axis;
    third means for damping horizontal translation of said sway rods; and
    fourth means for damping vertical translation of said mounting platform.

2. A suspension system according to claim 1, wherein said mounting platform is coupled to said sway rods by a plurality of apertured ball joints.

3. A suspension system according to claim 2 wherein a plurality of first annular snubbers coupled to said frame and disposed above said mounting platform include inner surfaces which act as said first means for limitiing horizontal translation of said sway robs and include lower surfaces which act as said second means for limiting vertical translation of said mounting platform in an upward direction.

4. A suspension system according to claim 3 wherein said third means for damping horizontal translation of said sway rods includes a plurality of disks pressed against said first annular snubbers by a plurality of springs coupled to said second ends of said sway rods.

5. A suspension system according to claim 4 wherein said mounting platform is vertically supported by a plurality of spacer tubes surrounding said sway rods and having a plurality of first and second cup washers for retaining a plurality of second springs above said spacer tubes.

6. A suspension system according to claim 5 which further includes a plurality of second snubbers disposed between the coils of said second springs to act as said second means for limiting the vertical translation of said mounting platform in the downward direction and to act as said fourth means for damping the vertical translation of said mounting platform.

7. A suspension system according to claim 6 wherein said sway rods are fixed to said frame via a plurality of support blocks and retaining rings.

8. A suspension system according to claim 6 wherein said sway rods are fixed to said frame via a plurality of support blocks and set screws.

9. A suspension system according to claim 2 which includes a plurality of first annular snubbers, having inner surfaces which act as said first means for limiting the horizontal translation of said sway robs, affixed to the upper ends of support brackets which are affixed to said frame, the lower ends of said support brackets having said sway rods affixed thereto by a plurality of press fittings.

10. A suspension system according to claim 9 which includes a plurality of second snubbers coupled to the free ends of said sway rods to act as said second means for limiting the translation of said mounting platform in the upward direction.

11. A suspension system according to claim 10 wherein said mounting platform is vertically supported by a plurality of spacer tubes which surround said sway rods and are disposed upon the lower ends of said support brackets, and a plurality of lower and upper cup washers which retain a plurality of first springs.

12. A suspension system according to claim 11 which further includes a plurality of third snubbers disposed between the coils of said first springs to act as said second means for limiting the vertical translation of said mounting platform in the downward direction and to act as said fourth means for damping the vertical translation of said mounting platform.

13. A suspension system according to claim 12 wherein said third means for damping the horizontal translation of said sway rods includes a plurality of second springs and a plurality of discs disposed between said first annular snubbers and said lower cup washers.

14. A suspension system according to claim 10 wherein said mounting platform is vertically supported by a plurality of first spacer tubes which surround said sway rods and are disposed upon the lower end of said support brackets, a plurality of lower and upper cup washers which retain a plurality of first springs and which are disposed between the upper and lower ends of said support bracket, and a plurality of second spacer tubes which surround said sway rods and which are disposed upon said upper cup washers.

15. A suspension system according to claim 14 which further includes a plurality of third snubbers disposed between the coils of said first springs to act as said second means for limiting the vertical translation of said mounting platform in the downward direction and to act as said fourth means for damping the vertical translation of said mounting platform.

16. A suspension system according to claim 15 wherein said third means for damping the horizontal translation of said sway rod includes a plurality of second springs and a plurality of discs disposed between said mounting platform and said first annular snubbers.

17. A sway rod suspension system according to claims 7, 8, 13, or 16 further including a stabilizer bar mounted to said frame and having linkage means coupled between said stabilizer bar and said mounting platform for preventing azimuthal rotation of said mounting platform.

18. A sway rod suspension system according to claim 17 wherein said linkage means includes at least two rods coupled to said stabilizer bar by a first set of ball joints and coupled to said mounting platform by a second set of ball joints.

19. A sway rod suspension system according to claim 18 wherein said stabilizer bar is mounted to said frame by at least one clip and bushing.

* * * * *